United States Patent
Whittaker et al.

[11] Patent Number: 5,889,959
[45] Date of Patent: Mar. 30, 1999

[54] FAST WRITE INITIALIZATION METHOD AND SYSTEM FOR LOADING CHANNEL ADAPTER MICROCODE

[75] Inventors: Bruce Ernest Whittaker, Mission Viejo; James Henry Jeppesen, III, Lake Forest, both of Calif.

[73] Assignee: Unisys Corporation, Blue Bell, Pa.

[21] Appl. No.: 583,376

[22] Filed: Jan. 5, 1996

[51] Int. Cl.$^6$ .............................. G06F 13/14; G06F 12/02
[52] U.S. Cl. .................................. 395/200.62; 395/200.6; 395/200.61; 395/872; 395/880
[58] Field of Search ..................................... 395/872, 880, 395/200.3, 200.6, 200.61, 200.62

[56] References Cited

U.S. PATENT DOCUMENTS

| | | | |
|---|---|---|---|
| 5,239,644 | 8/1993 | Seki et al. ................................. | 395/425 |
| 5,371,865 | 12/1994 | Aikawa et al. .......................... | 395/400 |
| 5,386,548 | 1/1995 | Nguyen et al. ......................... | 395/425 |
| 5,457,654 | 10/1995 | McLaury ............................. | 365/189.01 |
| 5,634,108 | 5/1997 | Freeman .................................. | 395/445 |

*Primary Examiner*—Thomas C. Lee
*Assistant Examiner*—Rehana Perveen
*Attorney, Agent, or Firm*—Alfred W. Kozak; Mark T. Starr; Steven R. Petersen

[57] ABSTRACT

A computer network serviced by a maintenance subsystem holds a control processing module (CPM) holding a Data Path Array as interface to a main memory module and I/O Module. A maintenance controller in the CPM has a preloaded Flash Memory unit holding all the necessary operating addresses and data which can be rapidly transferred via a special wide parallel high speed data bus to a data path array unit for subsequent conveyance to a channel microcode block in a main memory module. The operating data include channel microcode data necessary for the I/O Module to communicate with different types of peripheral devices.

4 Claims, 7 Drawing Sheets

FAST WRITE INITIALIZATION METHOD AND SYSTEM FOR LOADING CHANNEL ADAPTER MICROCODE

FIELD OF THE INVENTION

A system for enabling the maintenance subsystem of a computer network to rapidly Write microcode to the main memory connected to the network.

CROSS-REFERENCES TO RELATED APPLICATIONS

This application is related to a co-pending application U.S. Ser. No. 08/546,650, entitled-FAST WRITE INITIALIZATION SYSTEM FOR MICROCODE RAM VIA DATA PATH ARRAY USING PRELOADED FLASH MEMORY AND PROGRAMMABLE CONTROL LOGIC ARRAY, which was allowed on Sept. 8, 1997.

BACKGROUND OF THE INVENTION

Figure 3A:
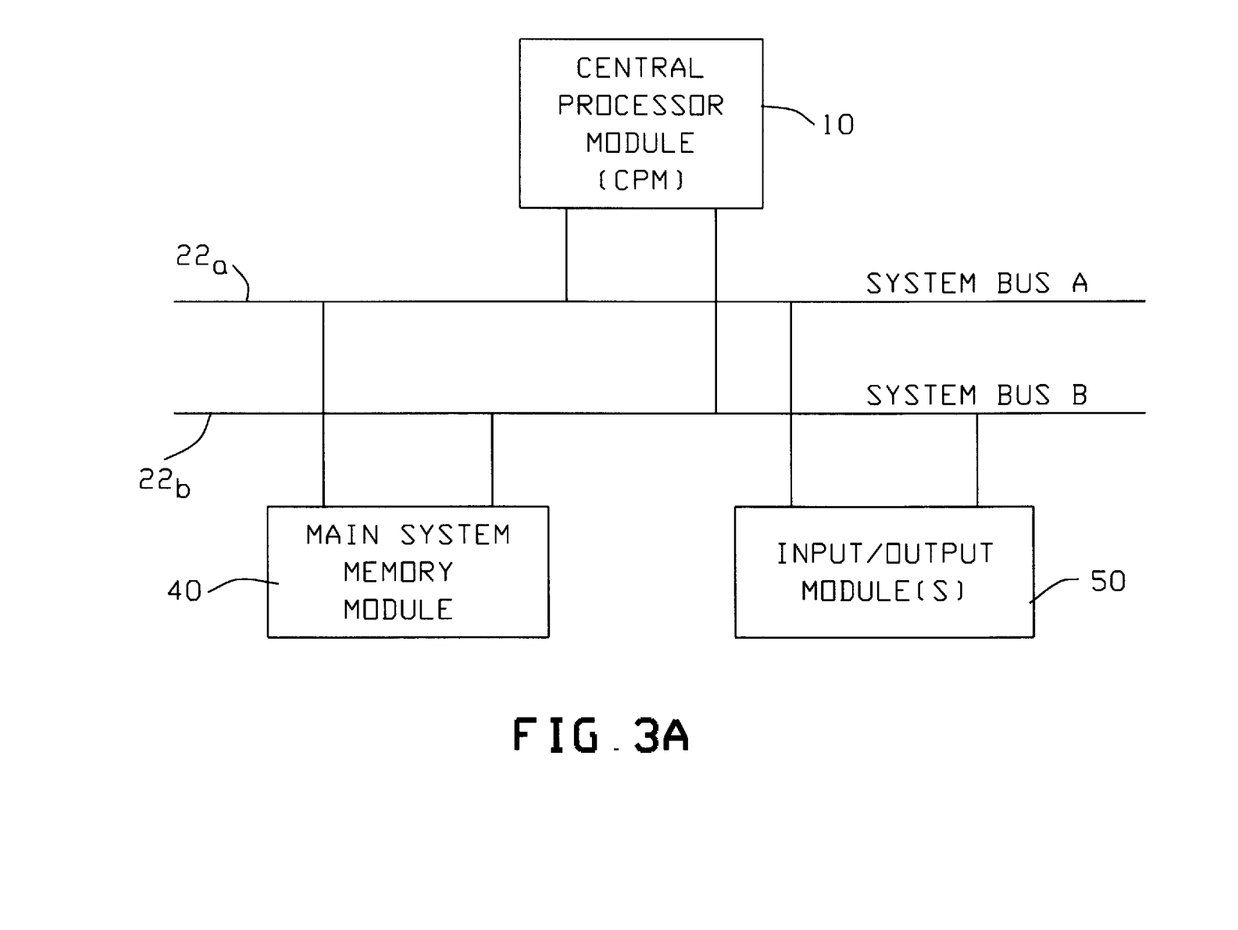
FIG. 3A is a generalized block diagram of a basic computer network connected to dual system busses.

A simplified network illustrating a computing system is seen in FIG. 3A which shows the basic elements of a central processing module (CPM) 10, a Main Memory Module 40 and an Input/Output Module 50. These modules are interconnected via a dual system bus structure designated as having two system busses 22a and 22b. These busses are interchangeable system busses and provide parallel redundant transfer paths.

Figure 3B:
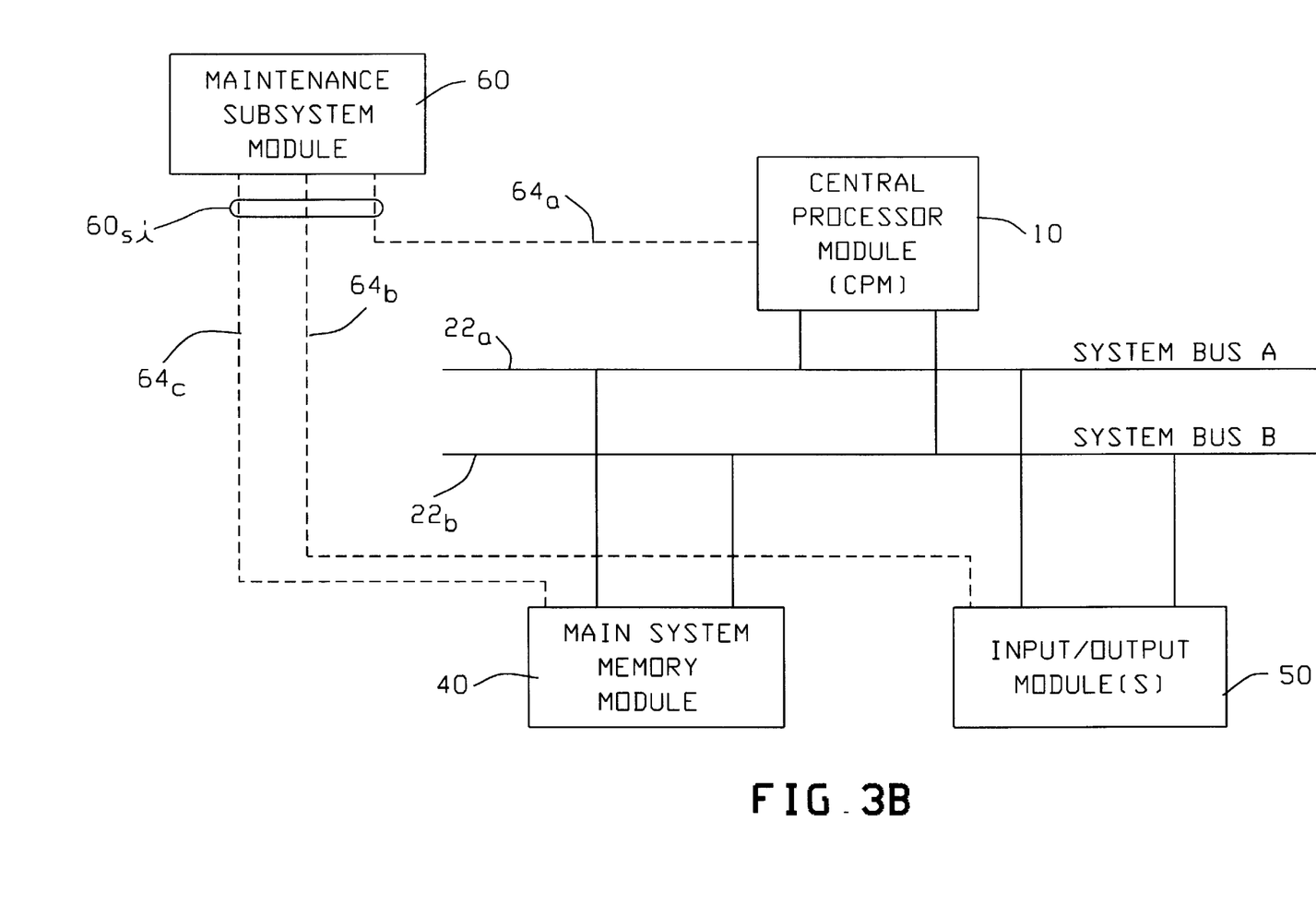
FIG. 3B is a block diagram of a basic computer network using a maintenance subsystem connected to the computer network by bit-serial data transfer and control lines.

The network of FIG. 3A is seen enhanced with the addition of a Maintenance Subsystem Module 60 which is shown in FIG. 3B. The Maintenance Subsystem Module 60 provides both diagnostic functions to all of the modules in the network but is also required to initialize all the system modules and to "start-up" the system for operation. In FIG. 3B, the Maintenance Subsystem 60 is shown connecting to all of the system modules by means of a dashed line series of connections 64a, 64b and 64c. These connections represent the basic maintenance connections of a JTAG integrity system such as is specified in IEEE 1149.1. The IEEE 1149.1 specification describes an industry standardized type of interface which provides a bit-serial data transfer between the various targeted modules of the network and the Maintenance Subsystem 60.

All the various system modules in the network are setup or "initialized" for system operation through the bit-serial interface lines 64a, 64b, and 64c. This type of interface is a system compromise between cost and performance. It is inexpensive cost-wise, since it is standard and only uses a few wires and since it is a bit-serial data transfer operation.

However, the bit-serial aspect of data transfer also makes it a very slow operation when massive amounts of information must be transferred. However, in many systems this is tolerable because the system initialization does not require an excessive amount of data transfer to most of the inter-connecting modules in a network.

In the architecture of FIG. 3B, the case is presented where inordinate and significant time periods are wasted when initialization is effectuated by only using the standard JTAG interface, especially when it is desired to transfer "channel microcode" instructions for the I/O module 50.

Figure 2:
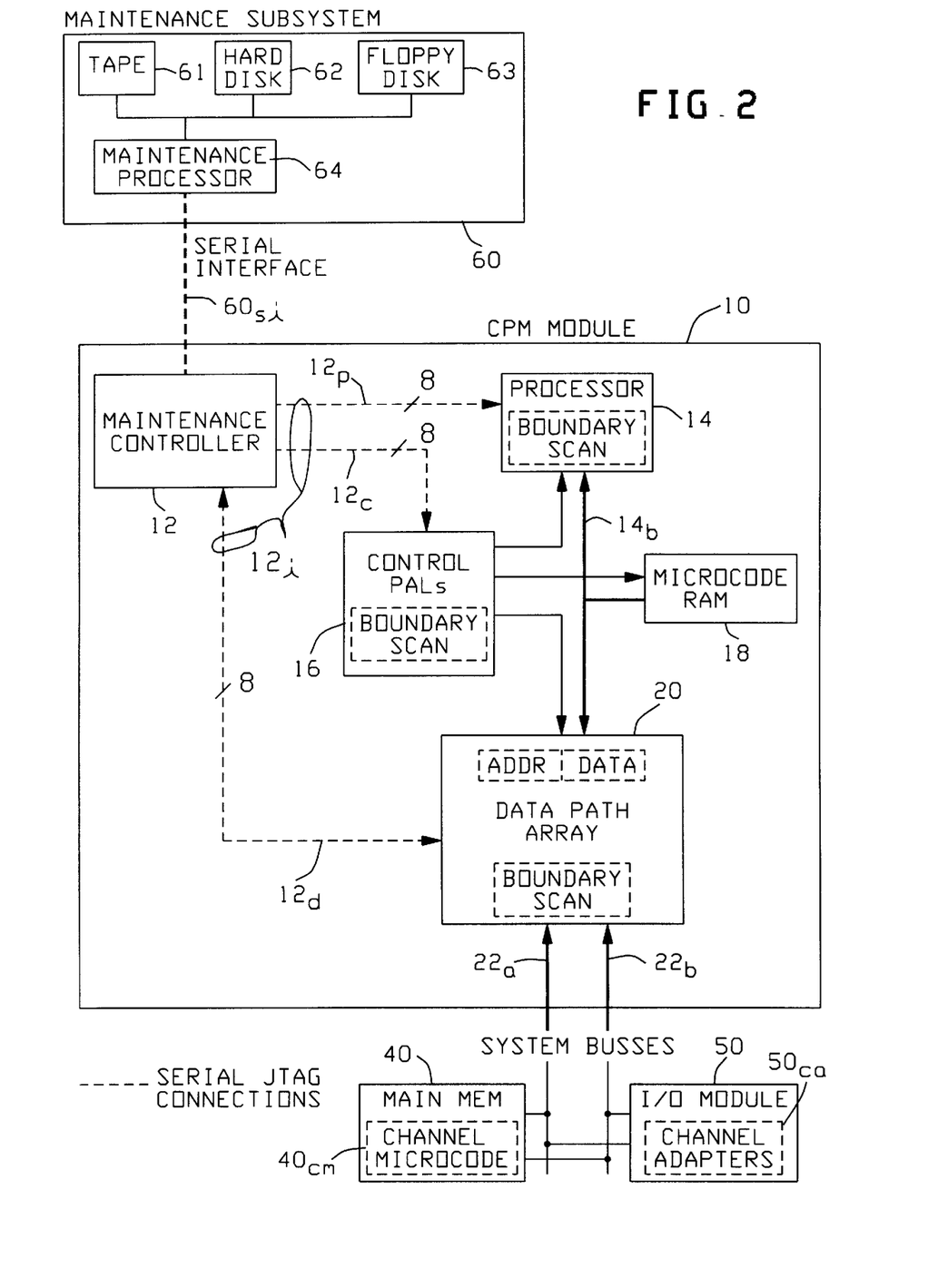
FIG. 2 is a network diagram of the earlier art which used bit-serial transfers and JTAG transfer lines for transferring data.

One type of central processing module 10 is shown in FIG. 2 connected to a Maintenance Subsystem 60. The Maintenance Subsystem 60 includes a maintenance processor 64 with several peripheral units attached, such as cartridge tapes 61, hard disk 62, and floppy disk 63. These devices can be used to provide the large database information that may be necessary to set-up the system for operation. The serial interface between the Maintenance Subsystem 60 and the central processing module 10 (CPM) is shown on bus lines 60si which connect the maintenance processor 64 from the maintenance subsystem over to the maintenance controller 12 of the CPM module 10.

Also seen in FIG. 2 are the major elements of the processor logic in the CPM 10. These include the processor 14, the Data Path Array 20, the Control PAL 16 and the microcode RAM 18 which holds the instruction codes for the processor 14. It will be seen that the processor 14 can access the major system modules 40 and 50 via the system busses 22a and 22b through the on-card Data Path Array 20. The Data Path Array converts from the on-card high speed processor bus 14b over to the slower inter-module system busses 22a and 22b. The soft, flexible Control PALs 16 is used to provide control of these busses and also the data path array operations.

In FIG. 2, the dashed lines are used to show the on-card versions of the serial JTAG connections which are indicated as 12p, 12c and 12d. Once initialization of a system has been completed in FIG. 2, these JTAG connection lines are no longer essentially used.

Figure 3C:
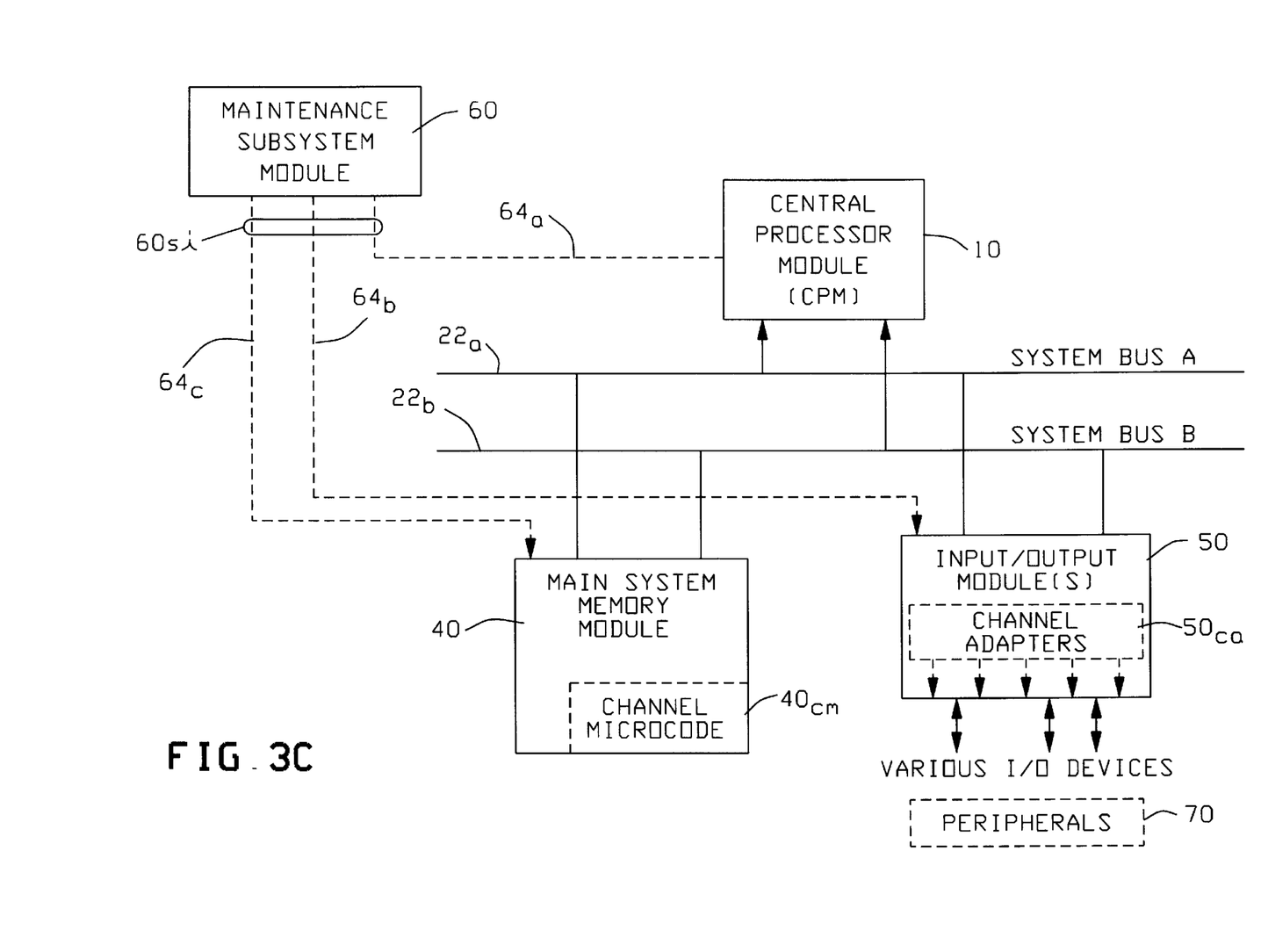
FIG. 3C is a diagram of a computer network with a maintenance subsystem and indicating the dedicated section for channel microcode in the main memory and the channel adapters in the input/output modules.

Another view of the computer network is illustrated in FIG. 3C where the Input/Output Module 50 is seen to have a dedicated unit for Channel Adapters 50ca and where the main system memory module 40 is seen to have a dedicated section 40cm. for holding the channel microcode designated 40cm. The Input/Output Modules 50 connect to various peripherals and are under control of the Channel Adapters 50ca which provide the appropriate protocol and timing for communication purposes.

The channel microcode unit 40cm of FIG. 3C is a dedicated repository for channel microcode instructions which enables the Channel Adapters 50ca of the Input/Output Module 50 to control and communicate data transfers between I/O module 50 and the peripherals 70.

For efficiency of design and of production, it is most desirable to make as few types of unique hardware units as possible, that is to say, it is optimum to use identical hardware to accomplish many different tasks. Thus, the I/O module 50, although it must interface with many different types of peripheral devices 70 (for example, SCSI disks, tapes, printers, etc.) may optimally use identical or very similar hardware to accomplish this. Each type I/O device (peripheral) is interfaced with its own individual Channel Adapter 50ca. These channel adapters which are used are essentially identical hardware. Then to allow each adapter to properly interface to the different peripheral units, there is required device protocols, there is required a unique "driver" software using the "channel microcode" to run each of the channel adapters 50ca.

At the original system initialization time period, the Maintenance Subsystem 60 is sensitive to the system I/O device configurations and connections. Because of this, it must load the appropriate "channel microcode" into the appropriate locations in Main Memory 40, shown as unit area 40cm in FIG. 3C. When the I/O module 50 is initialized and running, it will then access the appropriate devices "channel microcode" from the unit 40cm of the main system memory 40, and then bring this into the Channel Adapters 50ca for normal system operation.

The power of having "soft" microcode routines is useful in that somewhat standardized I/O hardware can be used to implement numerous varied types of I/O device connectivity. This flexibility comes at the cost of having to load up (Write) the channel microcode into the dedicated channel microcode unit 40cm of Main Memory 40 and this must be done each time that the system is initialized.

Now, such systems, as indicated in FIG. 3C, are essentially shown in loading the channel microcode since it was normally done through the JTAG bus 60si which has various sub-bus lines 64a, 64b, and 64c. The presently described system will be seen to function to eliminate the long time periods necessary to transfer microcode information from the Maintenance Subsystem 60 to the main system memory 40.

Earlier architectures and systems were very inefficient in regard to the loading of channel microcode such as seen in FIG. 3C. If the logic and architecture were implemented only as shown in FIGS. 2 and 3C, then it would still be possible to provide for the necessary writing of channel microcode into Main Memory 40. But however, there would be a quite significant delay, even to the extent of several minutes, for each individual occasion that the system was initialized. Thus, in the systems of FIG. 2 and FIG. 3C, it could be remarked that there were two levels (i) (ii) of inefficiency in regard to the loading up and writing in of channel microcode into the Main Memory Module 40.

PRIOR INEFFICIENCIES (i) Transfer Path from Disk or Tape to Main Memory:

The first undesirable inefficiency in the loading of channel microcode into the dedicated memory section 40cm of FIG. 3C would involve the source of the microcode data to be loaded. The source of the microcode data will be seen from FIG. 2 and FIG. 3C as originating from the cartridge tape 61 or from one of the disks 62, 63 which connect directly to the Maintenance Processor 64. Normally, unless a new release of microcode data words were being loaded, the source would normally and logically be the hard disk 62 (FIG. 2). However, it should be noted that every byte of the channel microcode data would have to be transferred over the serial interface 60si (64a, 64b, and 64c, FIG. 3B) between the Maintenance Subsystem 60 and the various system modules 40 and 50.

The protocol involved on the serial interface 60si of FIG. 2 and 3C is not operable for allowing "bursts" of data but instead requires several detailed actions of protocol operation for "each" byte of data transferred. For ordinary diagnostic operations, this seeming inefficient serial transfer method is normally sufficient. However, in network situations where there are large or massive amounts of channel microcode data which must be loaded from the Maintenance Subsystem 60 each time the system is initialized, then the overhead involved in the serial interface 60si and the slowness of reading the disk 62 is relatively very significant and very inefficient.

(ii) Channel Microcode Writing Loops:

The second inefficiency of the earlier art seen in FIG. 2 and 3C is that the standard JTAG interface 12i, FIG. 2, (12p, 12i, 12c, 12d) used on the central processing module 10, involves connections for all of the on-card components of CPM 10 to the maintenance controller 12 (FIG. 2). Again, for ordinary and standard diagnostics of the central processing module 10, this bit-serial interface 12i is useful and relatively cost effective. However, for the necessary loading of the channel microcode data from the Maintenance Subsystem 60 into the Main Memory 40 via the JTAG bit-serial connection via bus 60si and the bus 12d, it is apparent that the slowness of this transfer operation would be undesirable and often unacceptable.

Thus, by using only the JTAG serial connections 12p, 12c and 12d, it is possible to write (in a slow fashion) into the dedicated channel microcode area 40cm in the Main Memory 40. However, this procedure would require numerous separate items to be shifted by the Maintenance Subsystem 60 according to the series of steps (a) through (e) indicated hereinbelow.

(a) The maintenance processor 64 shifts the main memory address value into the Data Path Array 20 by using the serial interface 60si and the JTAG bus 12d. (FIG. 2).

(b) The maintenance processor 64 shifts the channel microcode word (one word at a time) into the Data Path Array 20 to provide the addresses and microcode words (data) as being available for later transference to Main Memory 40 at the dedicated area 40cm.

(c) The maintenance processor 64 shifts the appropriate control state into the Control PAL 16 to cause a memory Write operation to occur over one of the system busses 22a or 22b.

(d) Because of the protocol sequences involved, the above step (c) actually takes several steps to effectuate the appropriate bus protocols to effectuate the memory Write operation.

(e) For "each one" of the channel microcode words which must be transferred from the Maintenance Subsystem 60 to the Main Memory 40, there is required a repetition of steps (a), (b), (c), and (d).

The above sequence of steps will require many bit-serial shifts of some very long shift chains, in some cases involving 2000 flip-flops. The above mentioned procedure, which is controlled by the maintenance software running in the maintenance processor 64 will eventually effectuate the writing of the channel microcode words over to Main Memory 40, but this will be a very slow operation, sometimes on the order of several minutes. Thus, in this regard, the presently disclosed system and method will be seen to greatly enhance the loading of channel microcode into the Main Memory 40 with virtually no additional hardware costs and in only a few seconds.

SUMMARY OF THE INVENTION

In a computer network which requires the transfer of massive amount of microcode data from a maintenance subsystem through a central processing module unto a main memory, the present system provides for a rapid control and rapid transfer of microcode data from the maintenance subsystem to a dedicated portion of main memory in a few seconds of time rather than the normally required several long minutes which would usually be involved.

Before the computer network system is "initialized," the microcode data from a hard disk in the maintenance subsystem is pre-loaded into a flash memory unit attached to a maintenance controller in a central processing module. This obviates waiting for the transfer of data over a serial interface bus. A data path array has holding registers for addresses and data which can receive microcode words from the flash memory through a maintenance controller which controls the transfer of the channel microcode words over a bus from the maintenance controller to the data path array. A programmable array logic controller designated Control PAL provides the control signals for moving the data from the maintenance controller to the data path and from the data path array over to the Main Memory 40 which has a dedicated section for holding the channel microcode. This transfer is done over one of two dual system busses in a rapid fashion where massive numbers of data words can be transferred in a few seconds from the maintenance controllers flash memory to the dedicated channel microcode in the main memory module where it is now available for use by specialized channel adapters to communicate with various types of peripheral devices.

DESCRIPTION OF PREFERRED EMBODIMENT

Figure 1:
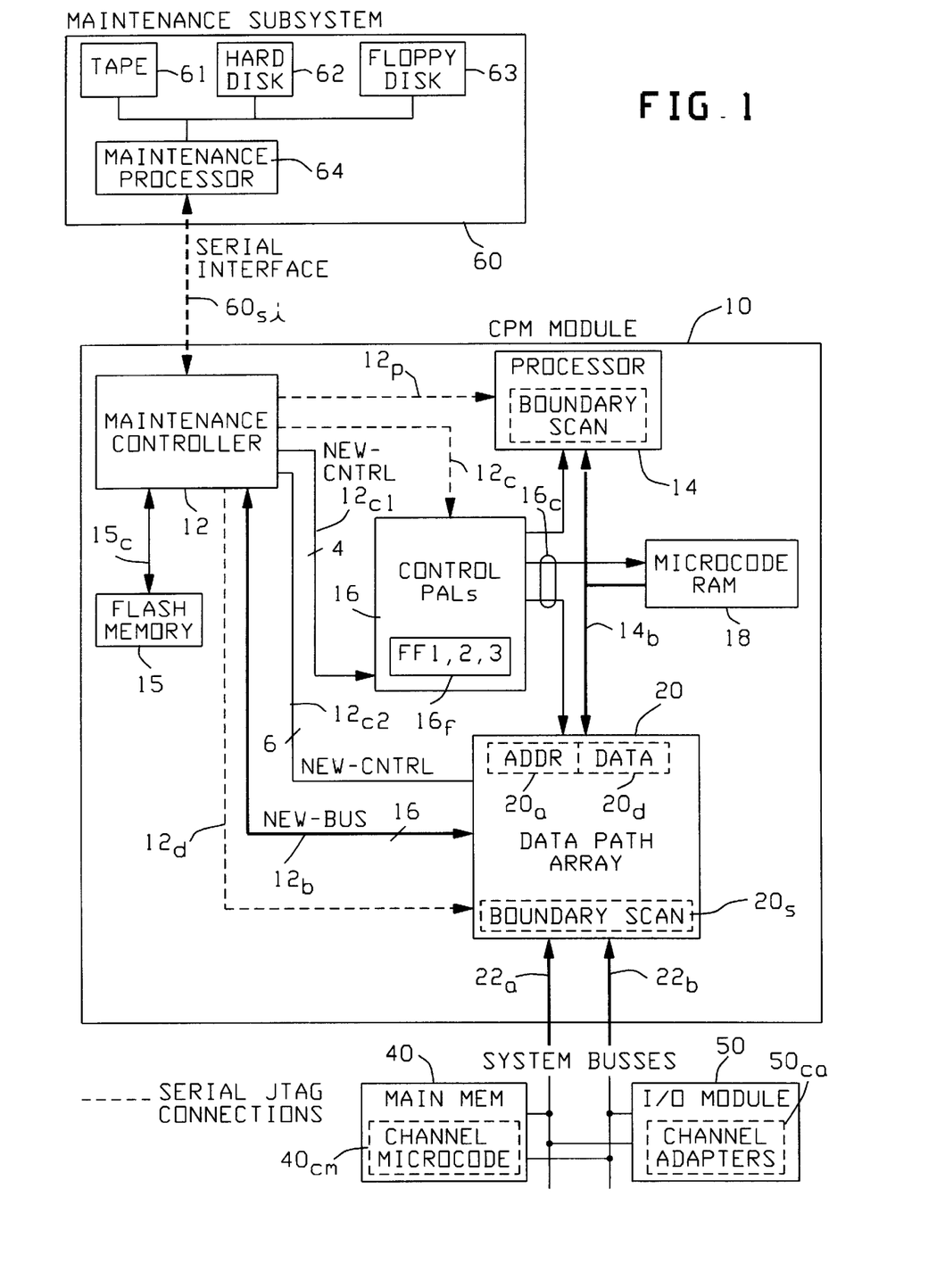
FIG. 1 is a drawing of the improved network for transferring microcode from a maintenance subsystem and writing into a dedicated section of main memory in a rapid fashion without undue delay.

FIG. 1 shows the improved system for the fast transfer of channel microcode from the Maintenance Subsystem 60 to main memory 40. The network shown in FIG. 1 indicates a Maintenance Subsystem 60 connected to central processing module 10 through a serial interface 60si. A Central Processing Module 10 is connected through dual system busses 22a and 22b to a Main Memory 40 and an Input/Output module 50. The Main Memory 40 has a dedicated portion 40cm for holding the channel microcode which is used by the channel adapters 50ca in the I/O module 50 for communicating to specialized peripheral devices which require specialized instructions provided by the channel microcode.

The central processing module 10 (CPM) has a Maintenance Controller 12 which communicates with the Maintenance Subsystem 60 in order to allow the "pre-loading" of massive microcode data from the Maintenance Subsystem 60 over to a Flash Memory 15 which then will have the channel microcode data readily available for distribution without the need to wait for transmission from the Maintenance Subsystem 60. A Data Path Array 20 uses a processor bus 14b to communicate with the processor 14 and the microcode RAM 18. A programmable array logic controller designated Control PAL 16 provides the control signals to the processor 14, microcode RAM 18 and Data Path Array 20 for the handling of data transfers.

In the improved system of FIG. 1, the maintenance controller 12 provides a high speed parallel transfer bus 12b between the maintenance controller and the Data Path Array 20 and further provides two control channels, 12c1 to the Control PAL 16 and 12c2 to the Data Path Array 20. The previously used JTAG lines 12p, 12c and 12d are now only used for diagnostic purposes and are no longer required for transfer of microcode data words.

The Flash Memory storage RAM 15 is a nonvolatile unit which provides a pre-loaded method of storing the microcode data within the central processing module, CPM10, itself, so that it is not necessary to wait for time-consuming loading from the Maintenance Subsystem. The Flash Memory 15 thus provides a large on-card data storage facility for maintenance controller 12 having an associated flash memory.

Under normal operations with the improved system of FIG. 1, the Maintenance Subsystem 60 will pre-load channel microcode into the Flash Memory RAM 15 and then, on system initialization, the channel microcode will be transferred from the database stored within the Flash Memory RAM 15. Thus, the microcode data can be transferred on the new bus 12b to the Data Path Array 20 and under control signals from the Control PAL 16, and then can be transferred over one of the system busses 22a, 22b to the dedicated section 40cm in the main memory 40. This transfer path is very fast when compared to the serial path 60si from the Maintenance Processor 64. Only when there is a new set of channel microcode words being added to the system, does the channel microcode database come across the serial interface 60si from the tape cartridge 61 on the hard disk 62. Further, at this time, the Flash Memory RAM 15 will be updated with the new database for the new channel microcode items.

Enhanced Channel Microcode Write Loop: As seen in FIG. 1, there is added two new direct controls on lines 12c1 (4 lines) and 12c2 (6 lines) and a new direct bus 12b (16 lines) from the maintenance controller 12 in order to provide for an enhanced channel microcode "Write loop." The enhanced loop then allows the maintenance controller 12 to utilize the fast wide parallel paths of bus 12b over to the Main Memory 40 via the system busses 22a, 22b, rather than using the previous slow, serial JTAG paths, 12p, 12c and 12d of FIGS. 1 and 2. The new direct lines allow the maintenance controller 12 to emulate the actions that the processor 14 would normally have to take using high speed bus 14b if it were writing to Main Memory 40.

Data Path Array (FIG. 1): The Data Path Array 20 of FIG. 1 provides the connection between the processor bus 14b on one side and the system busses 22a and 22b on the other side. The Data Path Array has a path for addresses and for data information which then can be written to the Main Memory 40. Under the earlier art, for each word written by the Maintenance Subsystem 60 into the Main Memory 40, the values for the address data and the main word data had to be shifted serially and slowly bit by bit (not in parallel as with the wide bus 12b) by means of the JTAG path 12d into the boundary 20s of the Data Path Array 20. Then, the Data Path Array 20 could source these values to the system busses 22a, 22b, for writing into the Main Memory 40.

In the enhanced configuration, there is provided an additional high speed parallel wide bus path 12b onto the Data Path Array 20 from the maintenance controller 12. These new direct connections include four control signals on line 12c1 and six control signals on lines 12c2, plus a 16-bit data transfer bus 12b (MP_DATA). By using the wide high speed 16-bit direct bus 12b, this allows the necessary wider fields (address=32 bits; data=52 bits) to be much more quickly built up in the Data Path Array 20 than could possibly have been done using the earlier "serial" JTAG shifting method. The signals involved in the new direct interface are described below in Table I.

TABLE I

| | |
|---|---|
| MP_LADDB | Signal from the Maintenance Controller 12 causing the current value on the MP_DATA bus 12b to be loaded into the selected portion of the data path array address register, 20a. |
| MP_STRDATLB | Signal from the Maintenance Controller 12 causing the current value on the MP_DATA bus to be loaded into the selected lower portion of the data path array data register, 20d. |
| MP_STRDATUB | Signal from the Maintenance Controller 12 causing the current value on the MP_DATA bus to be loaded into the selected upper portion of the data path array data register, 20d. |
| MP_REGSEK(1:0) | Two signals from the Maintenance Controller used to select which half of the address register is to be loaded or which half of the upper/lower portion of the data register in the data path array is to be loaded. |
| MP_ADDINCB | Signal from the Maintenance Controller causing the value in the data path array address register 20a to be incremented by one. |

Thus, the direct interface from the Maintenance Controller-Flash Memory over the high speed parallel transfer bus 12b to the Data Path Array 20, while minimal as to hardware impact, is significant as to enhancing the Write Channel Microcode Loop. The address value need only be issued "once" by the Flash Memory 15 and Maintenance Controller 12 and thereafter is easily and quickly incremented to the next address value by the Control PAL 16. Further, the data values to be written into the Main Memory 40 as Channel Microcode values can be issued by the Maintenance Controller 12 in a fraction of the time and effort previously expended. Also, significantly, the previously required time for the maintenance software and the maintenance processor 64 to calculate the new address for "each microcode word" to be transferred, is now saved. Once the address and the data are in the Data Path Array 20, all that is necessary is to emulate the processor paths to Main Memory 40 via the system bus 22a and 22b and that the necessary high-speed control signals on bus lines 12c1 and 12c2 be activated as they would be for normal processor operations. This is so since previously the Processor 14 was utilized to transfer microcode data on the high speed Processor Bus 14b over to the Data Path Array 20 thus tying up the processor 14 in a long consuming operation.

Enhanced Mode Control PAL: The Control PAL 16 in FIG. 1 is the master logic which decodes the processor commands and controls the steering of all data into and out of the Data Path Array 20. The Control PAL 16 also provides all the control and timing signals required for system bus operations to or from the Main Memory 40. All bus traffic on the internal processor bus 14b is directed by control signals from the Control PAL 16. The Control PAL controls all actions at the full clock speed of the Processor 14. All bus access and protocol for the busses 22a, 22b operations is directed by signals from the Control PAL 16. Thus, all the necessary controls are already in place to Write data over the system bus 22 into Main Memory 40. The Control PAL 16 already has the necessary signals to steer the address value and the data value in the Data Path Array 20 onto the system busses 22a, 22b. Signals already exist for operation of all system bus and main memory operations. The Control PAL 16 can function at full processor speed rather than the slow serial bit by bit type of situation as was previously required. The important and normal control signals for the Control PAL 16 are indicated below in Table II.

TABLE II

CONTROL PAL(16) SIGNALS

| | |
|---|---|
| WB_OUT | Signal when active indicates that a memory Write operation is active. This signal initiates a system bus write operation. |
| BIU_CMD(2:0) | Signals indicating the type of active system operation; equals "110" for system bus Write operations. |
| DOUT_MSEL(3:0) | Bus steering controls to the Data Path Array 20. Controls what values are driven onto the system busses, 22. |
| RDCMPLT | Signal indicating that the current system bus operation has completed successfully. For a Write operation, this signal indicates that the Write operation is totally complete. For a Read operation, this signal indicates the availability of the system Read data with the data path array registers. |

The signals indicated in Table II were used in earlier versions in the Control PAL 16. However, the new enhanced system operates to add a simple direct way by which the Maintenance Controller 12 can cause the sequences, that normally control the signals, to be executed. In basic effect, the new direct controls from the Maintenance Controller 12 simply operate to "logically-OR" into the existing control logic for these signals.

Table III indicated below, provides the logic equations for the control signals indicated in Table II for the Control PAL 16. The new, added maintenance controller terms are denoted. These equations indicate that very little new logic was necessary to add to the existing control terms in order to provide the fast Write pathing system. The logic equations for the Maintenance Controller 12 are indicated hereinbelow in Table III.

TABLE III

| LOGIC EQUATION | DESCRIPTION |
|---|---|
| WB_OUT= | |
| WB_EMPTY/+ WBOUTFF | normal logic |
| MPFF3*MP#WRB/ | maintenance controller term |
| BIU_CMD(2) = | |
| SNDMSGFF*RTODFF/ | normal logic |
| +WB_OUT | normal logic |
| +READLKFF | normal logic |
| BIU_CMD(1) = | |
| WB_OUT | normal logic |
| +READLKFF | normal logic |
| +RDMISSFF*READ4 | normal logic |
| BIU_CMD(0) = | |
| SBDNSGFF*WB_OUT/ | normal logic |
| +RTODFF*WB_OUT/ | normal logic |
| +READLKFF*WB_OUT/ | normal logic |
| +RDMISSFF*WB_OUT/*READ4 | normal logic |
| DOUT_MSEL (3,2) | |
| . . . | normal logic |
| +WRITE*MPFF3/ | maintenance controller term |
| DOUT_MSEL(1) = | |
| . . . | normal logic |
| +MPFF3 | |
| DOUT_MSEL(0) = | |
| . . . | normal logic |
| +MPFF3*(A#CVOUTF+B_CVOUTF) | maintenance controller term |

TABLE III-continued

| | | |
|---|---|---|
| RDCMPLT := | | |
| RDCMPLT/*SCMPLTFF*RDMISSFF | | normal logic |
| +... | | normal logic |
| +RDCMPLT/*SCMPLTFF*MPFF3 | | maintenance controller term |

Signals ending with "B" are active low
Notes:  := means to set a D-Flip-flop
= means a gate (combinatorial) term
+ means logical-or
* means logical-and
/ means logical-not
... means more normal logic not shown Glossary (for Table III)

Figure 4:
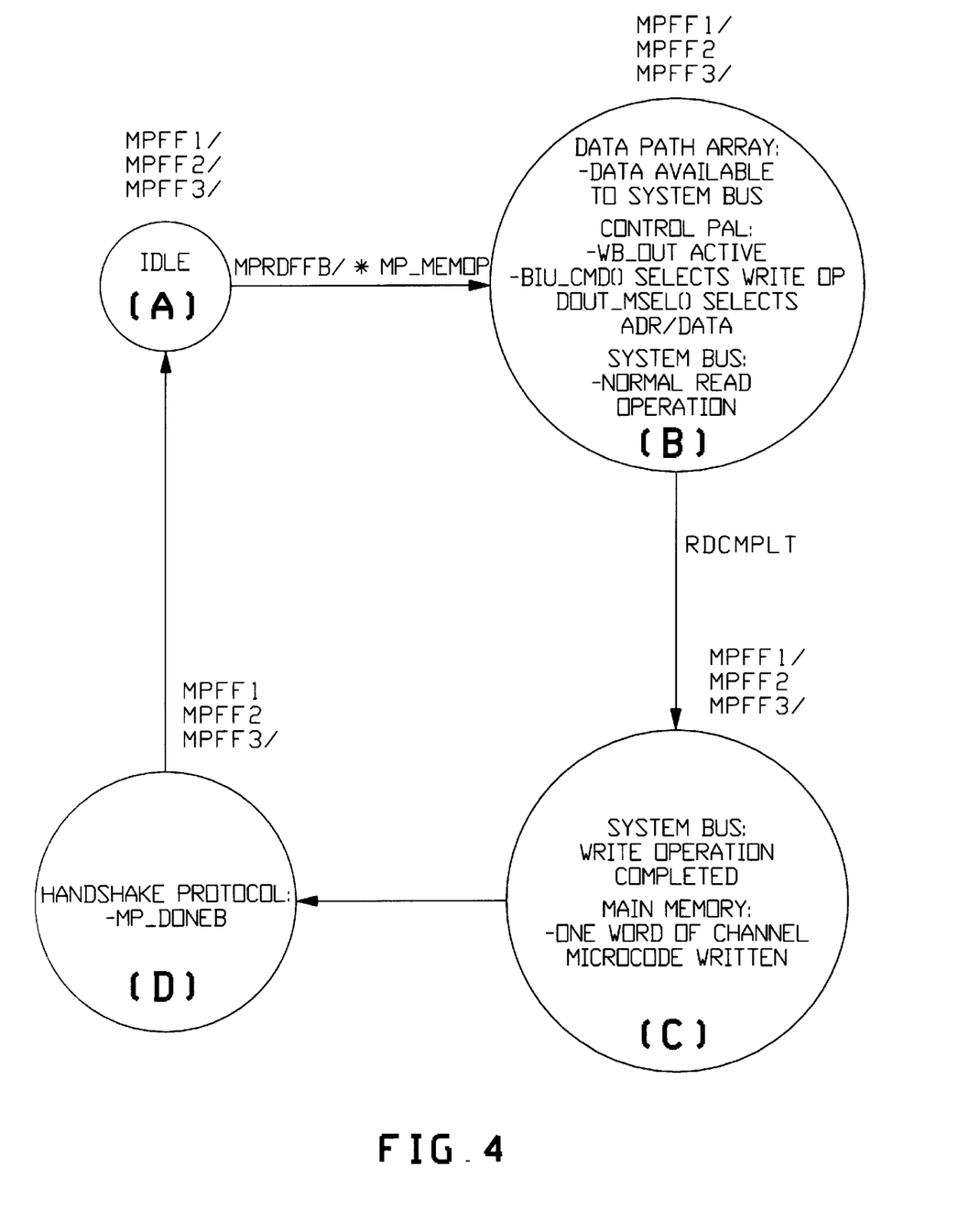
FIG. 4 is a schematic diagram showing the sequence of operations for transferring a word of channel microcode data from the maintenance subsystem to the main memory.

| | |
|---|---|
| WB_OUT: | This is the Write Buffer output signal which indicates that a Write operation to memory is active |
| WB_EMPTY: | This is the Write Buffer empty signal which indicates (when low) that it is not empty and that a Write operation can start. |
| +WBOUTFF: | This is the signal from the synchronization flip-flop used in Write out operations. |
| +MPFF3: | This is the state flip-flop for the control sequence of FIG. 4. |
| MP_WRB: | This is the signal from the maintenance controller 12 used to initiate a Write operation. |
| BIU_CMD(2): | This involves three signals (2:0) which indicates what particular current memory operation is active. |
| SNDMSGFF: | This signa indicates a send message operator is active. |
| RTODFF: | This signal indicates that a Read-Time-of-Day OP is active. |
| READLKFF: | This flip-flop indicates that a Read-Lock Operator (OP) is active. |
| RDMISSFF: | This flip-flop indicates a Read operation to memory is active. |
| READ4: | This indicates that a four-word Read operation is active. |
| DOUT_MSEL(3:0): | This involves four signals to steer outputs onto the system busses into the Data Path Array. |
| WRITE: | This signal signifies a Write operator decode operation. |
| MPFF3/: | This is the state flip-flop shown in FIG. 4, in the "off" state. |
| A_CVOUTF: | This is the system bus command valid signal for the (SA) system bus 22a as shown by the output flip-flop. |
| B_CVOUTF: | This is a system bus command valid (CV) output flip-flop for the second system bus (SB) 22b. |
| RDCMPLT: | This signal indicates that the current system bus operation has completed successfully. This is done via a processor clock signal. |
| SCMPLTFF: | This signal indicates the current system bus operation has completed successfully, but is done via the system bus clock, rather than the processor bus clock. |

In addition to the new logical-OR terms (+) seen in Table III, a small enhanced sequence to handle the protocol for direct control from the Maintenance Controller 12 is added to the circuitry of the Control PAL 16. This is discussed in the following section involving the direct protocol.

Enhanced Mode-Direct Protocol: In order to provide ability to emulate the parallel high speed processor bus 14b by the usage of the added high-speed, wide bus structure 12b by the Maintenance Controller 12, a four-signal direct interface is made between the Maintenance Controller 12 and the Control PAL 16. The Control PAL operates at the maximum clock rate which is that of the Processor 14. The Maintenance Controller 12 operates at a much slower clock rate. Thus, the new direct interface must provide for this asynchronous condition. This is accomplished by a handshaking arrangement. Of the four new signals in the direct interface, only three are used for writing the channel microcode into the Main Memory 40. These four control signals are indicated below in Table IV.

TABLE IV

| | |
|---|---|
| MP_WRB | Write control signal from the Maintenance Controller 12 indicating that the Control PAL 16 should execute a microcode RAM Write operation. |
| MP_DONEB | Return handshake signal from the Control PAL 16 indicating that the current operation is now complete. |
| MP_RDB | (not used here) |
| MP_MEMOP | Signal from the Maintenance Controller 12 indicating that the Control PAL should execute a system bus (memory) type of operation |

These are active low signals.

The incoming signal MP_WRB shown in Table IV is captured in a flip-flop called MPWRBFFB in the Control PAL 16. This synchronizes the signal to the processor clock 10 rate. The internal flip-flops in the Control PAL 16 are then used in the control sequence. These flip-flops are designated 16f in the Control PAL 16 of FIG. 1. These include three flip-flops, 16f (FF1, FF2, FF3), internal to the Control PAL 16, which are used to control the sequence of the protocol and the fast bus controls.

FIG. 4 shows the sequence of control operations. Referring to FIG. 4, the first state condition at (A) shows the idle situation where the three flip-flops MPFF1/, MPFF2/, and MPFF3/are in the "off" condition. This is seen in the "initial" stages of lines (f) (g) (h) of FIG. 5, indicating the new control sequence. Then transitioning from state (A) to state (B), there is seen a Maintenance Controller 12 Write flip-flop operation and a Maintenance Controller memory operation where at state (B) the third flip-flop MPFF3 is turned "on." This enables the Data Path Array 20 to have data available to the system bus and addresses available to the system bus. It also enables the Control PAL 16 to select a Write OP command and to provide a memory select command to select addresses and data which then enables the system bus to perform a normal Write operation.

On the transition from (B) to (C), FIG. 4 the signal RDCMPLT (of Table II) operates to turn "off" the third flip-flop (MPFF3) and turn "on" the second flip-flop (MPFF2) at which condition the system bus 22 indicates that the Write operation is completed and the main memory 40 has now received one word of channel microcode written into it. On the transition from (C) to (D), the handshake protocol indicates the return handshake signal from the Control PAL 16 indicating that the current operation is now complete (MP_DONEB of Table IV). Here at (D) the first and second flip-flops are "on" (MPFF1, MPFF2) while the third flip-flop is "off" (MPFF3/) after which the system returns to the Idle condition at (A).

Figure 5:
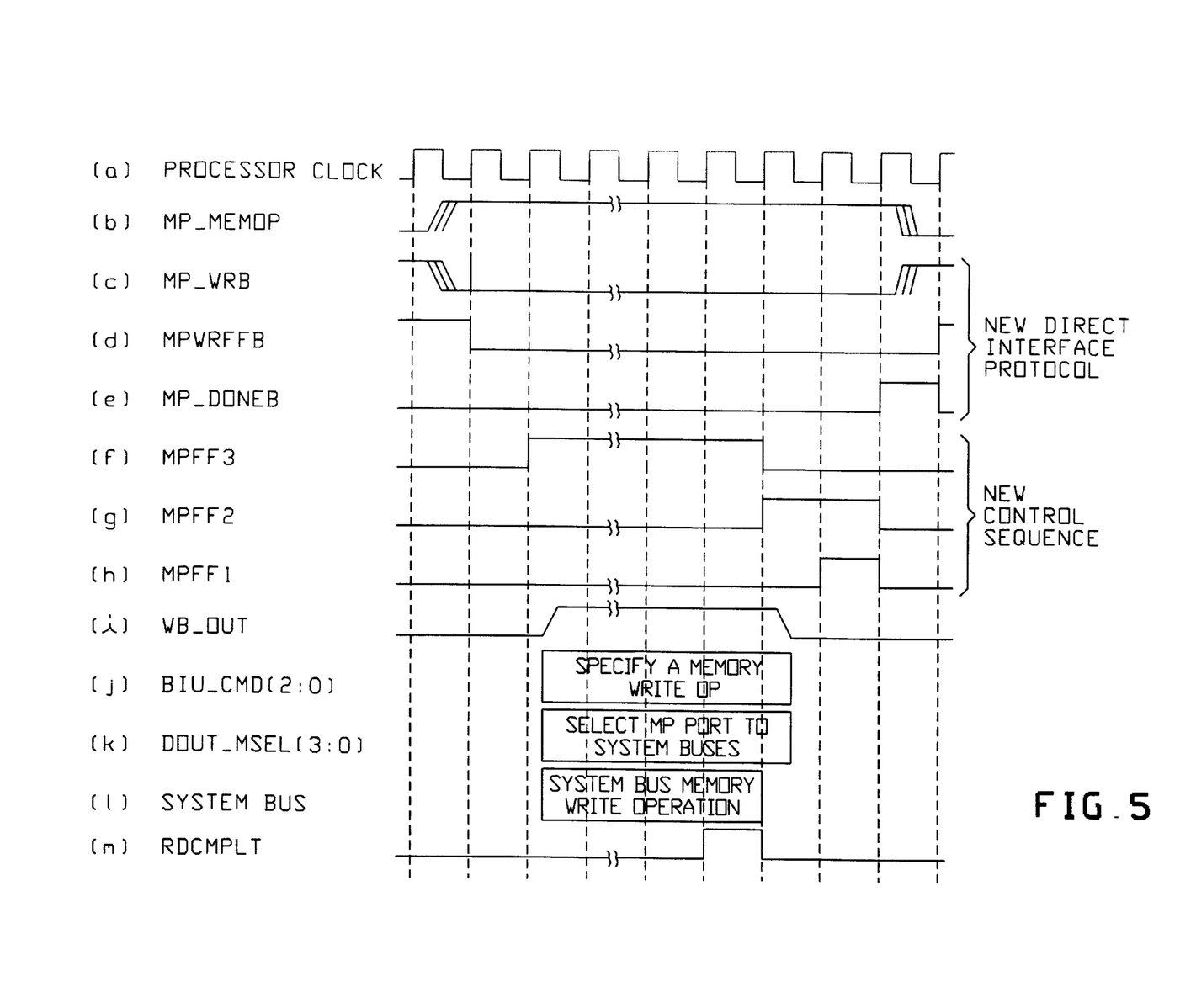
FIG. 5 is a timing diagram showing the signals involving the direct interface protocol and the new control sequences for providing a fast Write to main memory of the channel microcode data from flash memory which has been pre-loaded from the maintenance subsystem.

FIG. 5 is a timing diagram showing the timing of the protocol, the sequential operation of the flip-flops and the various normal control signals involved in writing the channel microcode over the system busses 22a, 22b to the Main Memory 40. FIG. 5 indicates how the processor path emulation sequence of bus 12b occurs for accomplishing the fast writing of channel microcode. Line (a) of FIG. 5 shows the processor clock while lines (b), (c), (d), (e) show the interface protocol. Lines (f), (g), (h) show the operation of the flip-flops for the new control sequence. Lines (i) through (j), (k), (l) and (m) show the completion of the memory write operation over the system bus.

First the Maintenance Controller 12 (after its Flash Memory 15 has already been pre-loaded from Maintenance Subsystem 60) initiates a Write operation using the enhanced direct protocol signals, MP__MEMOP and MP__WRB. With these signals, it signifies to the Control PAL 16 that a Write operation to main memory 40 is desired. These signals cause the third flip-flop MPFF3 of the new control sequence to be set as shown in FIG. 5, line f. These control flip-flops (FIG. 4) then accomplish most of the remaining effort to be done. As was seen in the equations of Table III, the normal signal WB__OUT is forced "on" by the third flip-flop MPFF3. Once the signal WB__OUT is "on," it automatically (via the Control PAL Logic 16) causes a system bus operation to occur. This logic automatically initiates and executes a memory Write operation. The only special actions that are required are that the signals DOUT__MSEL(3:0) be used for the steering of the Maintenance Controller address and data into the Data Path Array 20 and on to the system busses 22a, 22b.

As with normal control logic, FIG. 5 indicates that there is a delay or "wait" time while the slower system bus operation takes place. When the operation is complete, the signal RDCMPLT is issued, line m of FIG. 5, which indicates the completion of the Write operation. This signal then terminates the enhanced control sequence and enhanced direct protocol procedures. Thus, a full speed normal system bus Write operation occurs to the Main Memory 40 in behalf of the Maintenance Controller 12 for the writing of the channel microcode without the need to access the Maintenance Subsystem 60 since all the required information already resides in the Flash Memory 15 of the central processing module .

The enhanced fast emulation path is seen to be implemented with very minimal hardware costs. The new bus 12b and the controls 12c1 and 12c2 onto the Data Path Array 20 take up some possible 22 additional array connection pins which, in most cases, are normally available and thus the change to the use of the Data Path Array is freely arranged. The extra silicon usage internal to the Data Path Array 20 is there for the taking. In the case of the enhanced direct interface protocol sequence and the extra "OR" terms built into the Control PAL 16, again this is completely implemented using spare capacity within the existing Control PAL 16 and thus no new hardware is added. The interconnections for the control signals on the bus do add a few more etch connections on the printed circuit board, but however, the cost of these is rather negligible.

The enhanced fast Write to the memory system described herein provides the capability for a large or massive channel microcode database to be quickly loaded into main memory from a pre-loaded flash memory each time the system is initialized. By using high-speed, wide bus paths and emulating the normal controls utilized by the high-speed processor logic, this system provides the loading to be virtually invisible to the human operator where, in previous architectures, the time to transfer and load the microcode was measurable in several minutes of time which was often deemed frustrating and unacceptable.

While a single preferred embodiment of the fast write system has been described, it should be understood that other embodiments could still be implemented which are defined by the following claims.

What is claimed is:

1. An initialization system for rapid loading of operating microcode data, holding microcode instruction words and addresses, from a pre-loaded flash memory in a maintenance controller of a central processing module (CPM), to a main memory module, comprising:
   (a) a maintenance subsystem for pre-loading operating data into said flash memory before initialization of said system;
   (b) a central processing module for enabling, during initialization, the transfer of said operating microcode data in said flash memory to said main memory module, including:
      (b1) means for transferring said operating microcode data to a data path array for subsequent conveyance over a dual system bus means, including:
         (b1a) maintenance controller means providing control and bus connections from said flash memory to said Data Path Array;
         (b1b) programmable array control logic means for regulating the transfer of said operating microcode data to said Data Path Array and from said Data Path Array to said main memory module and including:
            (i) a plurality of control flip-flops for enabling the loading of said dual system bus means with said channel microcode instruction words for writing into said main memory module;
         (b1c) wide parallel high steed bus means from said maintenance controller means for transfer of said microcode instruction words and addresses to said Data Path Array;
         (b1d) control signal lines for initiating said programmable array control logic means to enable transfer of said operating microcode data;
      (b2) said dual system bus means for conveying said operating microcode data to said main memory module and for enabling transfer of said microcode data to an I/O Module from said main memory module.

2. The system of claim 1 wherein said main memory module includes:
   (a) a dedicated area for holding said channel microcode instruction words and addresses received from said flash memory.

3. The system of claim 1 wherein said I/O Module includes:
   (a) a plurality of channel adapters for enabling data transfers between different peripheral devices;
   (b) means to access said channel microcode instruction words resident in said main memory.

4. An efficiently rapid method of loading channel microcode words into main memory during initialization from a maintenance subsystem in a computer network, comprising the steps of:
   (a) executing a pre-load operation of microcode words and addresses from said maintenance subsystem to a flash memory in a maintenance controller;
   (b) transferring by said maintenance controller, said microcode words and addresses from said pre-loaded flash memory via high speed parallel bus means to address and data registers in a Data Path Array which interfaces, via a dual system bus means, to said main memory under control of a programmable array logic control means;
   (c) loading said main memory with said channel microcode words for availability by an I/O Module connected via said dual system busses to said main memory.

* * * * *